INVENTOR.
LOUIS MAZER
BY
ATTORNEYS

Nov. 2, 1965 L. MAZER 3,216,007

ANALOG-TO-DIGITAL CONVERSION SYSTEM

Filed July 13, 1962 3 Sheets-Sheet 2

INVENTOR.
LOUIS MAZER

BY
ATTORNEYS

Nov. 2, 1965 L. MAZER 3,216,007

ANALOG-TO-DIGITAL CONVERSION SYSTEM

Filed July 13, 1962 3 Sheets-Sheet 3

INVENTOR.
LOUIS MAZER
BY
Donald C Kearney

United States Patent Office 3,216,007
Patented Nov. 2, 1965

3,216,007
ANALOG-TO-DIGITAL CONVERSION SYSTEM
Louis Mazer, Palo Alto, Calif., assignor to the United States of America as represented by the Administrator of the National Aeronautics and Space Administration
Filed July 13, 1962, Ser. No. 209,801
6 Claims. (Cl. 340—347)
(Granted under Title 35, U.S. Code (1952), sec. 266)

The invention described herein may be manufactured and used by or for the Government of the United States of America for governmental purposes without the payment of any royalties thereon or therefor.

This invention relates to converters of the type which convert analog quantities represented by the angular position of a shaft to digital quantities, and is particularly concerned with increasing the resolution of these analog-to-digital converters.

It is often desirable that the resolution of a given shaft analog-to-digital converter be increased in order to facilitate greater discrimination between the analog quantities. For example, consider a converter which has a disc or commutator with 1000 counts or coded digital output pulses per full scale 360 degree rotation. Where this converter is employed with an instrument or other analog device having a full scale of 2000 analog counts or quantities, it will be appreciated that the digital output of the converter facilitates discrimination between only every other one of the analog counts. In order that every one of the analog counts be discernable in the digital output, it will be appreciated that the converter disc must be capable of generating an additional 1000 digital counts (2000 counts overall) for a full scale excursion of the analog device. In other words, the resolution of the converter disc must be doubled.

Heretofore it has been possible to increase the available resolution of a converter disc in several ways. The size of the disc may be increased to permit placement of the increased number of digital codes on the disc. In the foregoing specific example, doubling of the periphery of the disc is indicated in order to facilitate placement of 2000 codes on the disc. Unfortunately, in some applications increased size of the disc precludes its use. Alternatively, two discs may be geared together with the second disc being employed to count the number of revolutions of the first. In addition to the obvious disadvantage that two discs are required, some special means such as leading and lagging brushes must be utilized to prevent ambiguity at the specific point of transferring a count to the second disc. This multi-disc expedient hence becomes rather complex.

The present invention overcomes the foregoing limitations and disadvantages by facilitating substantial increases in the available resolution of the converter disc of an analog-to-digital converter without the requirement of increased disc size or additional discs. More particularly, doubling of resolution is attained through employment of step-up gearing or equivalent coupling means between the instrument or other analog device and the shaft of the converter such that the converter disc rotates twice for each full scale excursion or revolution of the instrument. A simple switch is employed with the instrument to indicate which half of a revolution the instrument scale is in, or in other words, whether the converter disc has had one or two revolutions for a given digital output count. Thus, the condition of the switch (On or Off) indicates to which one of two possible analog quantities a given digital output count pertains. In addition, switching ambiguity in the readout, viz., the digital counts generated during the imperfect unsharp transfer time of the switch from one state to another which could normally be each indicative of either of two possible analog counts due to the ambiguous condition of the switch, is prevented by an appropriate arrangement of instrument stops and a logic circuit coupled to the converter output. It will be thus appreciated that the present invention facilitates near doubling of the resolution of an analog-to-digital converter disc by means of any simple switch, no matter how imperfect, and yet precludes the inclusion of ambiguity in the readout.

For a complete understanding of the invention, reference may be had to the accompanying drawings, in which.

Figure 1:
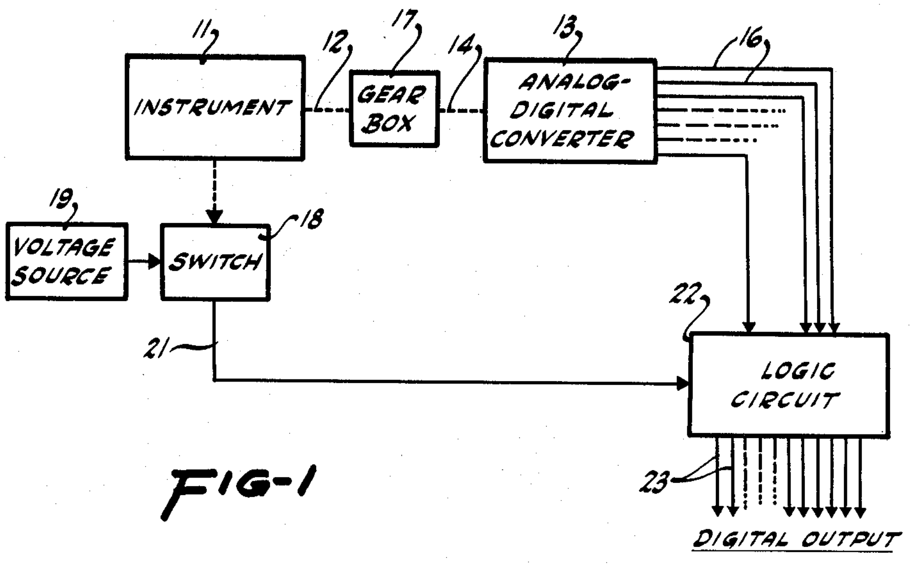
FIGURE 1 is a block diagram of the invention.

Referring to FIGURE 1 there is shown an instrument 11 which measures any analog quantity, such as voltage, pressure, displacement, or the like. Means are included in the instrument to convert the analog quantity to an angular position of an output shaft 12 representative of that quantity. The analog counts of the instrument are thus available in the form of fractions of one revolution of the shaft 12, one shaft revolution being taken as a full scale excursion of the instrument.

In order to convert the analog counts represented by angular displacements of the shaft 12 to digital form, a conventional shaft analog-to-digital converter 13 is provided with its input shaft 14 coupled to shaft 12. The converter 13 is not described in detail herein inasmuch as various converters of this type are well known and the specific details thereof have no bearing upon the principles of the present invention. It suffices to state that the converter 13 includes a converter disc or commutator which translates the position of the input shaft 14 to a digital output of any one of various forms, i.e., binary, decimal, quinary, etc., the digital count of the output being representative of shaft position. The digital output of the converter is available in pulse form from a plurality of conductors 16. Pulses appearing in various ones of the conductors or combinations thereof are indicative of predetermined fractions of a revolution of the input shaft 14.

In accordance with the illustrated embodiment of the present invention, the available resolution of the converter 13 is substantially doubled, viz., nearly twice as many digital output counts are developed for a given angular displacement of an analog device coupled to the converter input shaft, without increase in the size of the converter disc or in the number of discs employed. To this end a 2-to-1 step-up gear box 17, or equivalent speed ratio coupling device, is provided to couple the output shaft 12 of instrument 11 to the input converter shaft 14, which then rotates twice for each revolution of the instrument shaft. For each full scale excursion of the instrument two complete sets of digital output counts appear in the converter output conductors 16. Thus, although the digital count has been doubled, each digital count is indicative of either of two analog counts or quantities depending upon whether the converter disc is in its first or second revolution. In order to discriminate between the two possibilities, a simple switch 18 is provided in conjunction with the instrument 11 to provide information as to which half of a revolution the output shaft 12 is in, or conversely which one of two revolutions the disc is in. More particularly, the switch 18 may be, for example, a mercury tilt switch, 180° cam actuated switch, or the like coupled to the shaft 12 so as to be closed during one half of a shaft revolution and open during the other half. The switch is electrically connected between a voltage source 19 and an output conductor 21, a voltage pulse thereby appearing in the conductor during one half and zero voltage appearing in the conductor during the other half of the shaft revolution. Thus, the absence or appearance of a pulse in conductor 21 indicates which of the two possible analog counts is represented by a given digital count in the converter conductors 16.

Unfortunately, switches are not available which will transfer sharply between open and closed conditions precisely at the termination of one half of a shaft revolution and initiation of the other half revolution. Existing switches have an inherent ambiguity as to the precise instant they will transfer. In other words, a switch might transfer at any instant within a given range, but not at a precise given instant. This range corresponds to an increment of shaft revolution representative of a given number of analog counts. The specific number of counts corresponding to the transfer interval of a given switch is herein termed switch ambiguity. During the interval of switch ambiguity, the appearance or absence of a pulse in conductor 21 cannot be relied upon as an indication of which of the two possible analog counts is represented by the digital output of the converter. This difficulty is uniquely overcome in accordance with the present invention by the appropriate positioning of stops in the instrument 11 to prevent the digital counts produced in response to the ambiguous analog counts from showing up twice. More specifically, the stops are positioned to reduce the total available counts of the instrument scale by an amount equal to the ambiguity. The logical conditions thus presented by the particular placement of the stops are incorporated in a logic circuit 22, a form of which is subsequently considered in detail herein. The circuit 22 is coupled to the converter output conductors 16 and the switch output conductor 21. These conductors are appropriately coupled in the circuit in accordance with the logical conditions to digital output lines 23. The pulse output count in the lines 23 is precisely representative of the analog count and is free of ambiguity.

Figure 2:
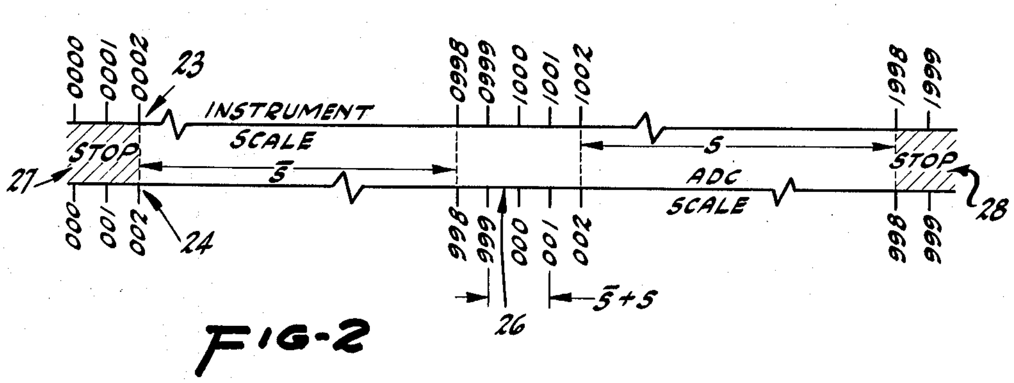
FIGURE 2 is a graphical presentation of the respective scales laid side by side of a 2000 count end zero instrument and a 1000 count converter disc depicting one arrangement of instrument stops which may be employed in the doubling of disc resolution without ambiguous readout, in accordance with the invention.

The placement of the instrument stops in accordance with the foregoing considerations will be better understood upon reference to FIGURE 2 which is to be taken as merely exemplary and in no way limiting upon the invention. As shown therein, a 2000 count scale 23 of the instrument 11 is juxtaposed with a 1000 count scale 24 of the analog-to-digital converter 13. The analog counts of scale 23 range from 0000 to 1999, whereas the digital counts of scale 24 range from 000 to 999. The converter scale is illustrated for two revolutions with the first revolution terminating and the second revolution beginning as indicated at 26, which corresponds to the 1000 count of scale 23. In this example, it is assumed that switch 18 has a three count ambiguity such that when it is set to transfer at point 26, actual switch transfer may occur any place within the ambiguity interval, denoted by $\bar{s}+s$ (switch may or may not be operated) which embraces the digital counts 999, 000, and 001 corresponding to analog counts 0999, 1000, and 1001. However, the switch is always operated ($s$) for the digital counts ranging from 002 to 998 in the second revolution of the disc and always not operated ($\bar{s}$) for the same digital counts in the first revolution of the disc. Thus, if stops 27, 28 are placed at the opposite ends of the instrument scale to limit the instrument excursion or shaft rotation to an overall range which permits but a single occurrence of analog counts corresponding to the ambiguous digital counts 999, 000, 001, the digital output is readily made wholly unambiguous. More particularly the stop 27 is set to limit the instrument excursion to an initial count of 0002 while the stop 28 is set to prevent excursion beyond counts 1998. Thus, the ambiguous digital counts 999, 000, 001, which would otherwise be possibly indicative of either the analog counts 1999, 0000, 0001, or 0999, 1000, 1001 can now be only indicative of the latter set of counts. The logical conditions established by the setting of the stops are accordingly that the digital count (N′) corresponds to the analog count (N) when the switch is not operated ($\bar{s}$) and the digital count is not 000 or 001 ($\overline{000}+\overline{001}$) or when the digital count is 999. The digital count plus 1000 counts corresponds to the analog count when the switch is operated (s) and the digital count is not 999, ($\overline{999}$), or when the digital count is 000 or 001. More concisely in Boolean algebraic notation, the logical conditions are:

$$N=N' \text{ for } \bar{s}\ (\overline{000}+\overline{001})+999$$
$$N=N'+1000 \text{ for } s\ (\overline{999})+000+001.$$

Figure 5:
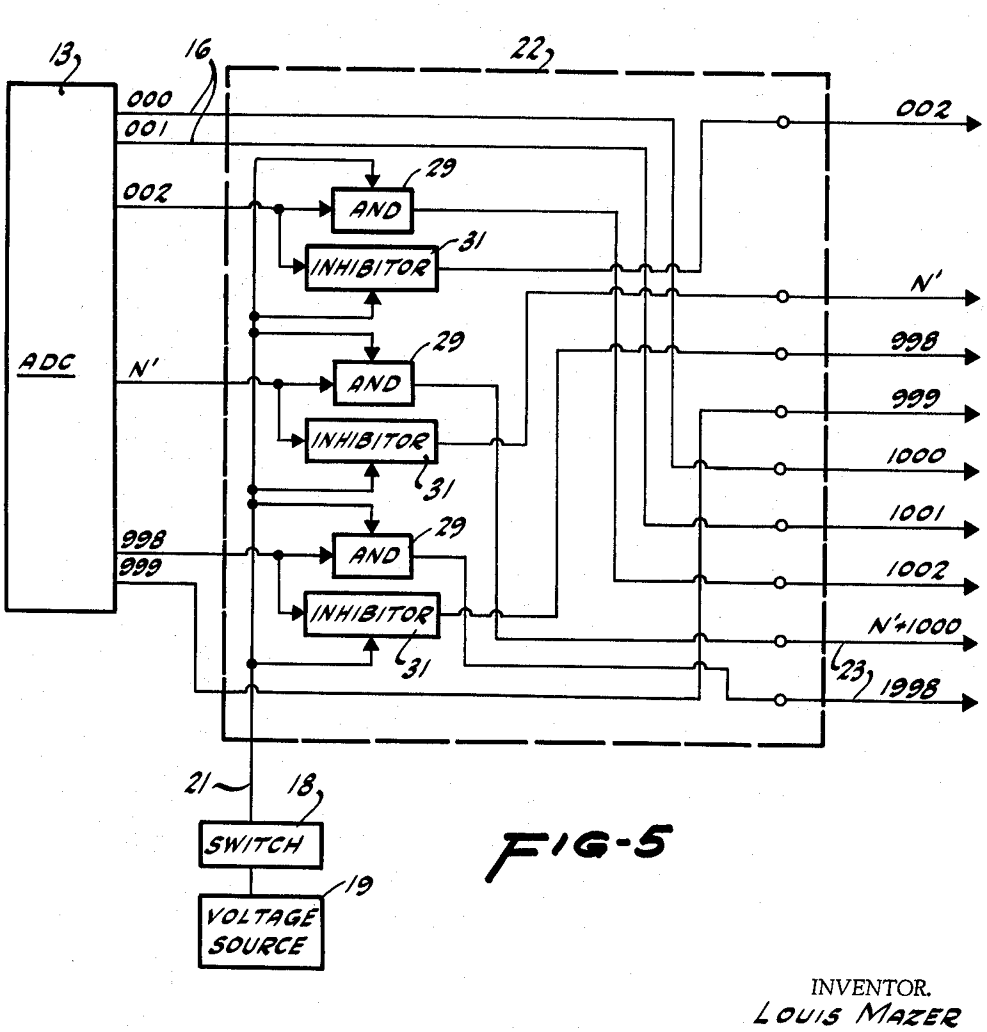
FIGURE 5 is a block diagram of one form of logic circuit which may be employed with the invention.

When the logic circuit 22 is designed in accordance with the foregoing logic equations, the digital output of the converter is readily instrumented to provide a 1,997 position readout in the output lines 23 from a 1,000 position converter disc. Logic circuits of a variety of forms are readily designed to establish conditions in accordance with logic equations in a manner well known in the computer art. One possible form of logic circuit which may be employed to provide the desired readout is depicted in FIGURE 5. In this circuit the various output conductors 16 from the converter are respectively designated with one of the digital counts ranging from 000 to 999. The conductors corresponding to the ambiguous counts 999, 000, 001 are respectively directly connected to output lines 23 from the logic circuit which are designated as the analog counts 0999, 1000, and 1001. This connection arises from the conditions established by the instrument stops which cause the ambiguous digital counts to be singularly indicative of the stated analog counts. The remaining converter output conductors, respectively, indicative of the digital counts ranging from 002 to 998 are each commonly connected to one of a plurality of "and" gates 29 and one of a plurality of inhibitor or anticoincidence circuits 31. The output line 21 from switch 18 is connected in parallel to the pluralities of "and" gates and inhibitor circuits. The outputs from the respective inhibitor circuits are connected to output lines 23 designated by analog counts equal to the digital counts with which the corresponding conductors 16 are labeled. In other words, the conductors with designations N′ are coupled through the corresponding inhibitor circuits to output lines with designations N, viz., conductors 002 . . . 998 are coupled through inhibitor circuits to lines 002 . . . 998. The outputs from the respective "and" gates on the other hand are coupled to output lines 23 designated by analog counts $N=N'+1000$. Thus, the conductors 002 . . . 998 are coupled through "and" gates to output lines 1002 . . . 1998.

In the operation of the logic circuit just described, a converter output pulse at any one of the conductors designated 999, 000, 001, is applied directly to the output lines designated 999, 1000, 1001. A pulse at any of the remaining output conductors designated by N′ in the range 002 to 998 is simultaneously applied to the corresponding "and" gate and inhibitor circuit. In the presence of a switch pulse applied to the "and" gates (viz., the switch is operated ($s$) and the converter disc is hence in its second revolution) a pulse is generated in the output line connected to the particular "and" gate, and as noted previously, this line is designated $N'+1000$. Conversely, the presence of a switch pulse at the corresponding inhibitor circuit prevents a pulse from appearing in the N′ designated output line coupled thereto.

In the absence of a switch pulse at the "and" gates and inhibitor circuits (viz., the switch is not operated ($\bar{s}$) and the converter disc is in its first revolution) the situation is reversed. A pulse from a given output conductor designated N' is now passed by the corresponding inhibitor to the N' designated output line and blocked by the "and" gate from the $N'+1000$ designated output line. Thus, an unambiguous 1997 position digital pulse output representative of the analog count of the instrument 11 is provided at the output lines 21 with a 1000 count converter disc.

Figure 6:
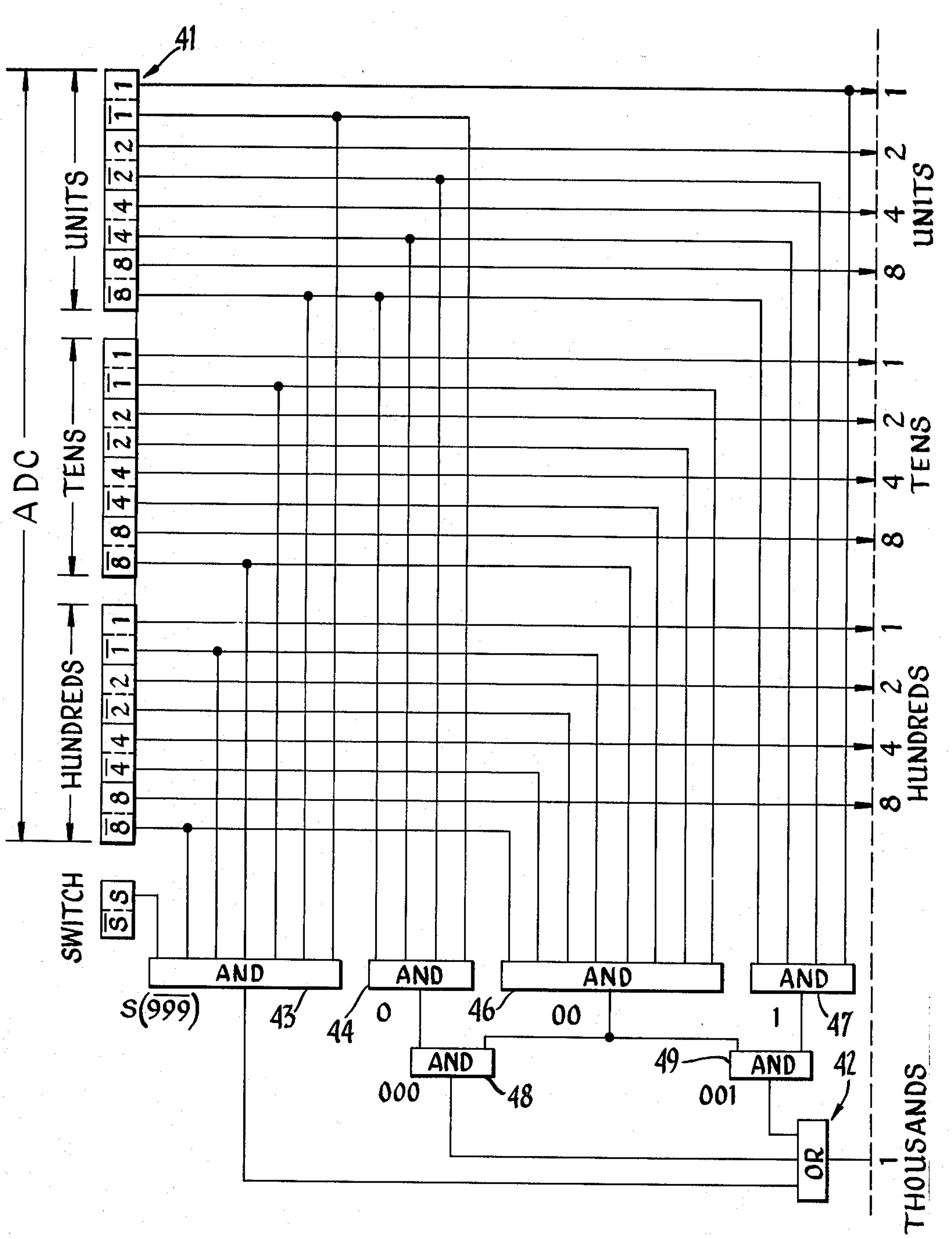
FIGURE 6 is a circuit diagram of a simplified logic circuit which may be employed with the invention.

Although the logic circuit of FIGURE 5 described above serves to illustrate an implementation of the invention, a more practical and simplified circuit may be employed using a three decade binary-coded decimal circuit. FIGURE 6 illustrates an example of a simplified logic circuit for implementing the relationship $N=N'+1000$ for s $(\overline{999})+000+001$. This circuit employs an analog-to-digital converter 41 of a binary-coded decimal type having both "true" and "false" outputs for each of the "bits" of information. As shown, the "true" output for each of the "bits" is directly connected to corresponding ones of a three decade binary output. The digit "one" of the thousands decade is obtained from a combination of AND circuits and an OR circuit 42. A first AND circuit 43 has inputs from the switch 18 and $\bar{8}$ and $\bar{1}$ outputs of the units, tens and hundreds of the ADC to produce $s\ (\overline{999})$. The "false" outputs $\bar{1}$, $\bar{2}$, $\bar{4}$, and $\bar{8}$ of the units bank of the ADC are applied to a second AND circuit 44 and similar outputs of the tens and hundreds are applied to a third AND circuit 46. A fourth AND circuit 47 is connected to the 1, $\bar{2}$, $\bar{4}$, and $\bar{8}$ outputs of the units bank. A combination of outputs from the AND circuits 44 and 46 at an AND circuit 48 produces the 000, and a combination of outputs from AND circuits 46 and 47 at a further AND circuit 49 produces 001. The outputs of the AND circuits 43, 48, and 49 are then fed into the OR circuit 42 to obtain the digit "one" of the thousands decade, i.e., $N=N'+1000$, for the condition $s\ (\overline{999})+000+001$. Clearly, the circuit may be alternatively comprised to implement the negation of the foregoing function, i.e., $(s\ (\overline{000}+\overline{001}+999)$, so that the negated output would provide the digit "one" of the thousands decade. The circuit of FIGURE 6 will be seen to require only seven gate circuits and may be formed with only 30 diodes, so as to provide a truly practical logic circuit fully complementing the economic advantages of the present invention.

Figure 3:
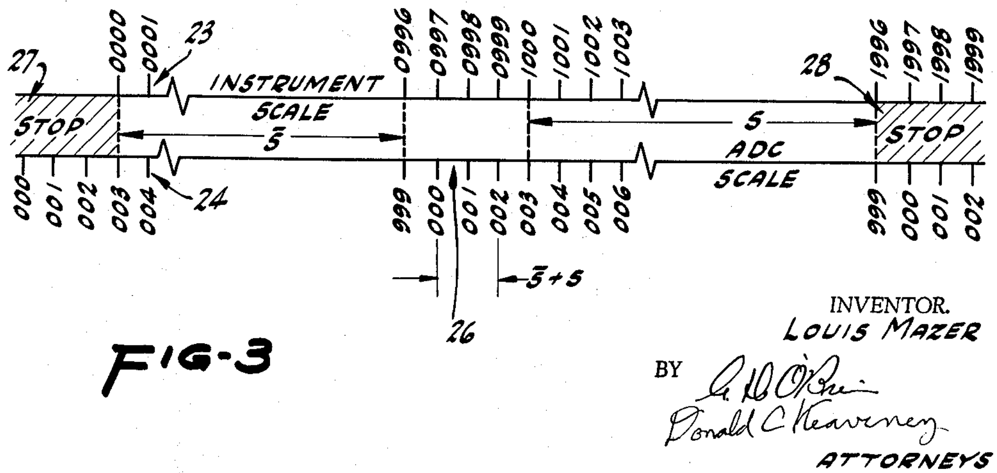
FIGURE 3 is a graphical presentation similar to FIGURE 2, but illustrating an alternative stop arrangement.

Considering now other logical conditions which may be established by the positioning of the instrument stops 27, 28 and instrumented in the logic circuit 22 to provide an unambiguous readout, it is to be noted that positioning of the stops, as shown in FIGURE 2, results in the loss of a small portion (0000 and 0001) of the zero end of the scale. It is sometimes more desirable that the entirety of the zero end of the scale be retained and all reduction occur at the upper end of the scale. To effect the foregoing, the scale may be zero shifted, as shown in FIGURE 3. More particularly, the zero of the digital count scale 24 is shifted with reference to the instrument scale 23 an amount to three counts (the ambiguous counts) in order to retain the complete use of the instrument scale at zero. The digital count 003 now corresponds to the analog count 0000 or 1000 and digital count 999 corresponds to analog count 0996 or 1996. The ambiguous counts are now 000, 001, 002 which are all disposed at the upper end of the scale. Stops 27, 28 are positioned in the present instance to limit the instrument excursion between 0000 and 1996. The corresponding logic equations are thus as follows:

$$N=N'-3 \text{ for } \bar{s}\ (\overline{000}+\overline{001}+\overline{002})$$
$$N=N'+997 \text{ for } s+000+001+002$$

In the employment of the zero shifted instrument to provide an unambiguous readout from lines 23, it will be appreciated that the logic circuit 22 is now designed in accordance with the above logic equations.

Figure 4:
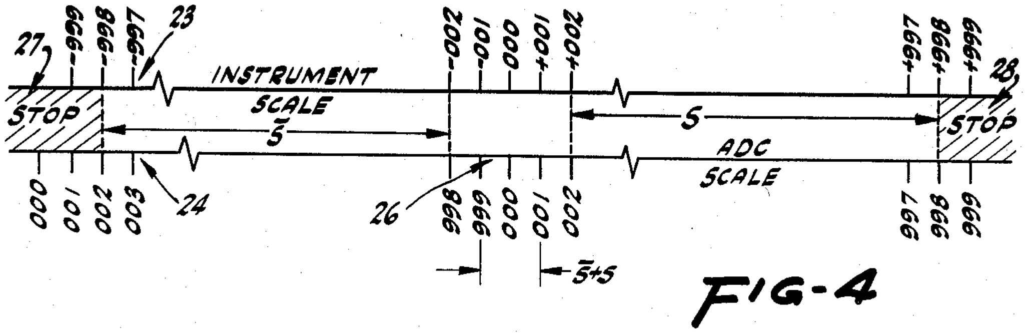
FIGURE 4 is a graphical presentation similar to FIGURES 2 and 3, but depicting a stop arrangement for a zero centered instrument.

Another modification of the invention is depicted by FIGURE 4, wherein the scale conditions of a zero centered instrument are graphically illustrated. The analog count 000 is in this instance at the center of the instrument at the center of the instrument scale, with positive and negative analog counts through 999 increasing in value in opposite directions from the center zero. It is desirable that the ambiguous decimal counts 999, 000, 001 normally corresponding to analog counts of either $-001$, 000, $+001$ or $+999$, 000, $-999$ be disposed at the ends of the scale. The stops 27, 28 may then be positioned to limit instrument excursion to counts between $-998$ and $+998$ and thereby eliminate the ambiguity in the readout. Logical conditions established are as follows:

$$N=N' \text{ for } s\ (\overline{999})+000+001$$
$$N=-(1000-N' \text{ for } \bar{s}\ (\overline{000+001})+999$$

To instrument the readout, the logic circuit 22 is hence now designed in accordance with the above logic equations.

Upon obtaining an understanding of the invention from the exemplary embodiment and specific example described above, it will be apparent that many different embodiments are possible without departing from the scope of the invention. Thus, it is intended that all matter contained in the above description and shown in the accompanying drawings shall be interpreted as illustrative only, the scope of the invention being defined by the appended claims.

What is claimed is:

1. In combination with an analog output shaft representative of a full scale of analog counts for 360 degrees of rotation and a shaft-to-digital converter including an input shaft connected to a converter disc having a full scale digital count output for 360 degrees of disc rotation, resolution doubling means comprising 1:2 speed ratio coupling means connecting said analog shaft to the input shaft of said converter, said converter disc thereby rotating at twice the speed of said analog shaft and producing a full scale set of decimal counts for each half revolution of said analog shaft, switch means coupled to said analog shaft and in closed condition during one half revolution and in open condition during the other half revolution of analog shaft rotation to thereby indicate which half revolution the analog shaft is in for given decimal counts of said disc, and stop means associated with said analog shaft to limit rotation thereof to less than one revolution and reduce the scale of analog counts thereof by an amount corresponding to the ambiguity interval of said switch means in transferring between closed and open conditions.

2. In combination with an analog output shaft representative of a full scale of analog counts for 360 degrees of rotation and a shaft analog-to-digital converter including an input shaft connected to a converter disc having a full scale digital count pulse output for 360 degrees of disc rotation, resolution doubling means comprising 1:2 speed ratio coupling means connecting said analog shaft to the input shaft of said converter to rotate said disc twice per one revolution of said analog shaft, said disc thereby producing a first full scale set of digital count pulses representative of analog counts in the first half revolution of said analog shaft and a second identical full scale set of digital count pulses representative of analog counts in the second half revolution of said analog shaft whereby each digital count is representative of either of two analog counts, 180 degrees actuated switch means coupled to said analog shaft and operative to produce a switch pulse for a first portion of analog shaft revolution substantially equal to one half revolution and to not produce a switch pulse for an identical second portion of revolution substantially equal to the other half revolution, said switch means having a transfer ambiguity between said first and second portions corresponding to a predetermined number of analog and corresponding digital counts, stop means operatively associated with said analog shaft to limit its rotation to one revolution reduced by an amount corresponding to said predetermined number of analog counts, and a logic circuit having inputs coupled to the digital count pulse output of said converter and to said switch means, said logic circuit being instrumented in accordance with the logical conditions established by said stop means and switch means to produce an unambiguous digital pulse output representative of the full scale of said analog counts reduced by said predetermined number of analog counts.

3. The combination of claim 2, further defined by said analog shaft having a full scale of 2000 analog counts N, said converter having a full scale of 1000 digital counts N′, said predetermined number of digital counts comprising N′ equal to zero and N′ equal to a first predetermined number of consecutive integers at the lower end of the digital count scale and N′ equal to a second predetermined number of consecutive integers at the upper end of the digital count scale, and said stop means and switch means establishing logical conditions specified by $N=N'$ in the absence of a switch pulse and when N′ is not zero or one of said first predetermined number of integers or when N′ is one of said second predetermined number of integers and specified by $N=N'-1000$ in the presence of a switch pulse and when N′ is not one of said second predetermined number of integers or when N′ is zero or when N′ is one of said first predetermined number of integers.

4. The combination of claim 2, further defined by said analog shaft having a full scale of 2000 analog counts N, said converter disc having a full scale of 1000 digital counts N′, said scale of analog counts shifted upward relative to said scale of digital counts by an amount equal to said predetermined number of counts, said predetermined number of counts thereby comprising digital counts of zero and a predetermined number of integers at the upper end of said scale of digital counts, and said stop means and switch means establishing logical conditions specified by N equals N′ less said predetermined number of counts in the absence of a switch pulse and when N′ is not zero or one of said predetermined number of integers and specified by N equals N′ plus 1000 less said predetermined number of counts in the presence of a switch pulse or when N′ is zero or one of said predetermined number of integers.

5. The combination of claim 2, further defined by said analog shaft having a full scale of 2000 analog counts N zero centered and positively increasing in one direction from zero while negatively increasing in the opposite direction from zero, said converter disc having a full scale of 1000 analog counts N′, said predetermined number of digital counts comprising N′ equals to zero and N′ equal to a first predetermined number of consecutive integers at the upper end of the digital count scale and N′ equal to a second predetermined number of consecutive integers at the lower end of the digital count scale, and said stop means and switch means establishing logical conditions specified by $N=N'$ in the presence of a switch pulse and when N′ is not one of said first predetermined number of integers or when N′ is equal to zero or one of said second predetermined number of integers and specified by $$N=-(1000-N')$$

in the absence of a switch pulse and when N′ is not zero or one of said second predetermined number of integers or when N′ is one of said first predetermined number of integers.

6. A system for doubling the resolution of an analog-to-digital converter having an input shaft adapted for connection to an analog output shaft and said converter being capable of producing $x$ digital counts for one revolution of said analog output shaft, coupling means connecting said analog output shaft to said converter input shaft to rotate said input shaft two revolutions for every revolution of said analog output shaft, a predetermined point on said analog output shaft being free to rotate through consecutive quadrants A, B, C, and D, means coupled to said analog output shaft for generating a first signal condition when said predetermined point occupies said quadrants A and B and a second signal condition when said predetermined point occupies said quadrants C and D, and a logic circuit combining signal intelligence from said generating means and said converter to produce substantially $2x$ digital counts for each revolution of said analog output shaft.

References Cited by the Examiner

UNITED STATES PATENTS 3,007,637 11/61 Meirowitz ------------ 340—347

MALCOLM A. MORRISON, *Primary Examiner.*